United States Patent
Patton et al.

(10) Patent No.: US 9,087,156 B2
(45) Date of Patent: Jul. 21, 2015

(54) APPLICATION VERSION RELEASE MANAGEMENT

(71) Applicant: Google Inc., Mountain View, CA (US)

(72) Inventors: Brian Patton, London (GB); Nicolas Fortescue, Oxford (GB); Piotr Krzysztof Swigon, London (GB); John Ayres, London (GB); Maximilian Ruppaner, London (GB); Elizabeth Ireland Powers, London (GB); Eva-Lotta Lamm, London (GB); Alan Michael Stokes, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/081,071

(22) Filed: Nov. 15, 2013

(65) Prior Publication Data

US 2015/0143345 A1    May 21, 2015

(51) Int. Cl.
G06F 9/44 (2006.01)
G06F 11/36 (2006.01)

(52) U.S. Cl.
CPC .................. G06F 11/3688 (2013.01)

(58) Field of Classification Search
CPC .................................................. G06F 11/3688
USPC .......................................................... 717/131
See application file for complete search history.

(56) References Cited

U.S. PATENT DOCUMENTS

| | | | |
|---|---|---|---|
| 7,555,551 B1* | 6/2009 | McCorkendale et al. | 709/225 |
| 8,331,901 B2* | 12/2012 | Raleigh | 455/405 |
| 8,839,035 B1* | 9/2014 | Dimitrovich et al. | 714/25 |
| 2009/0253517 A1 | 10/2009 | Bererton et al. | |
| 2010/0240461 A1 | 9/2010 | Rasmussen et al. | |
| 2013/0054682 A1* | 2/2013 | Malik et al. | 709/203 |
| 2013/0067298 A1* | 3/2013 | Li et al. | 714/799 |
| 2013/0073336 A1 | 3/2013 | Heath | |
| 2013/0204664 A1 | 8/2013 | Romagnolo et al. | |

OTHER PUBLICATIONS

Keepsafe Engineering (Jul. 31, 2012) retrieved from http://keepsafe-engineering.tumblr.com/post/28437940369/easy-mobile-ab-testing on May 27, 2014.*
Crameri et al., Staged Deployment in Mirage, an Integrated Software Upgrade Testing and distribution System, ACM (Oct. 14, 2007).*
Keepsafe, Keepsafe Engineering Blog, Keepsafe Engineering (Jul. 31, 2012) retrieved from http://keepsafe-engineering.tumblr.com/post/28437940369/easy-mobile-ab-testing on May 27, 2014.*

(Continued)

*Primary Examiner* — Don Wong
*Assistant Examiner* — Theodore Hebert
(74) *Attorney, Agent, or Firm* — Morris & Kamlay LLP (57) ABSTRACT

Implementations of the disclosed subject matter provide systems and methods for providing one or more versions of an application to one or more subsets of users based on measured performance of the one or more versions of the application. A method may include providing a first version of an application to a first subset of users of the application. Next, performance of the first version of the application may be measured and a second subset of users of the application may be selected based on the performance of the first version of the application. As a result, a second version of the application may be provided to the second subset of users of the application.

15 Claims, 3 Drawing Sheets

(56) References Cited

OTHER PUBLICATIONS

Golick, Introducing rollout: Condionally roll out features with redis, jamesgolick.com (Aug. 1, 2010) retrieved from http://jamesgolick.com/2010/8/1/introducing-rollout-condionally-roll-out-features-with-redis..html on Sep. 7, 2014.*

Golick II, rollout, Protose Inc. (2010) retrieved from https://github.com/FetLife/rollout/blob/0a7188f07339f4edc38a042b70b9d53775e1b62e/README.rdoc on Sep. 7, 2014.*

Apptimize,"AB Testing for Android and IOS", Available at: apptimize.com/index.html. Date visited: Aug. 19, 2013.

* cited by examiner

APPLICATION VERSION RELEASE MANAGEMENT

BACKGROUND

The market for applications is rapidly growing, but the ability to test applications prior to public release has lagged behind. A new application developer may launch their application to the general public and some users may experience performance issues associated with the application. Performance issues may also arise based on an unanticipated load on the application server when launching the application to the general public. The poor performance of the application may affect the ratings and reputation of the new developer, and may negatively impact revenue and popularity of the new developer and/or application. Additionally, a well-established developer may release a new updated version of their application to the population of existing users of the application. The new updated version of the application may cause performance issues, for example, that were not occurring in the previous version. This may result in a loss of users, negative feedback/reviews, and/or lost revenue.

BRIEF SUMMARY

According to an implementation of the disclosed subject matter, a method may include providing a first version of an application to a first subset of users of the application. Performance of the first version of the application may be measured. Next, a second subset of users of the application may be selected based on the performance of the first version of the application. The second subset of users may be larger than the first subset of users. A second version of the application may be provided to the second subset of users of the application. Performance of the second version of the application may be measured, and a third subset of users of the application may be selected based on the performance of the second version of the application. The third subset of users may include both the first subset of users and the second subset of users.

According to an implementation of the disclosed subject matter, a method may include providing a first version of an application to a first subset of users of the application. Next, performance of the first version of the application may be measured and a second subset of users of the application may be selected based on the performance of the first version of the application. As a result, a second version of the application may be provided to the second subset of users of the application.

An implementation of the present disclosure provides a system including a processor configured to provide a first version of an application to a first subset of users of the application. The performance of the first version of the application may be measured. Next, a second subset of users of the application may be selected based on the performance of the first version of the application. As a result, a second version of the application may be provided to the second subset of users of the application.

Prior to releasing an application to the general public, implementations of the disclosed subject matter may provide a developer of an application with the ability to release a version of an application, e.g., a test version, an updated version, and the like, to a subset of users (e.g., 5% of users) rather than the general public. Performance information associated with the application may be collected and this information may be used to select another subset of users (e.g., 25% of users, 100% of users, etc.) to whom the application may be provided. This may improve a developer's ability to test and improve the quality of an application prior to releasing an application to the general public. Additionally, the developer may be able to test the stability of the application by incrementally releasing the application to users (e.g., 5% of users then 25% of users, then 80% of users, then 100% of users), verifying that the application server is stable under an increasing load of users. Overall, the disclosed subject matter may allow for improved application quality and user satisfaction. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

The present disclosure allows a developer to select or leverage a pre-existing community or population of users who may receive a pre-release version of their application. A user may opt into receiving a pre-release version of the application. For example, an application developer may wish to launch their new application to some private subset of users or a well-established developer may want to roll out a new version their application out to a small portion of their existing users. As a result, a developer may be able to observe the application's performance and correct/fix any major performance issues reported (by, for example, 5% of their users) before releasing the version to the general public. This may help to improve the quality of applications and help developers maintain their reputation and a strong rating for their application by giving them the ability to correct/fix performance issues prior to a major public release. Additionally, the present disclosure may reduce testing and development costs by alleviating and addressing application performance problems earlier before releasing an application to the public.

In general, the present disclosure provides a mechanism for distributing a specific version of an application to one or more subsets of users, a pre-existing community of users, a domain membership of users, a stable pre-release group of users, and the like. A developer configuration system may allow developers to configure various configurations of their application's packages to be distributed to a subset of users. Users may be given a user-facing opt-in mechanism, allowing authorized users to become testers of a given application.

Specifically, user opt-ins may be recorded and membership in relevant opt-in groups may be confirmed when determining the version of an application to be delivered to a specific subset of users. In an implementation, social network communities may be utilized such that developers may maintain a community of test users. Additionally, selection of a stable subset of users for the lifetime of an application rollout (which may be modified with new application versions mid-rollout) may be achieved by recording a random seed to be used for identifying particular users until the rollout is complete.

As an example, a startup game developer may be in the process of building a new application, Grumpy Otters, and they may wish to pre-release the application to a subset of alpha testers. Alpha testers may be invited to join the developer's private invite-only social network community. An alpha version of the Grumpy Otters application may be configured for distribution to this community, and the alpha testers may be asked to visit a site to opt-in for the testing of the alpha version of the application. Next, these alpha testers may able to install the application and may be able send their feedback and comments regarding the application to the developer and/or application provider.

As another example, the Grumpy Otters developer may wish to offer a press-only pre-release of a more stable beta version of the application. A process similar to the one above may be followed. This beta version release of the application to the press-only subset of users may occur simultaneously as the alpha version test release to the alpha user group described above. In this case, the developer may receive feedback and comments from both the alpha testers regarding the alpha version and the press-only testers regarding the beta version.

Furthermore, following the launch of version 1 of the Grumpy Otters application, the developers may be ready to begin testing of the newest version 2 of the application. The developer may wish to initiate a testing rollout, which is provided only to a subset of potential recipients of the application. For example, for rollout of version 2, a random 5% of the application user population (who have opted in to such rollout testing) may be selected. Based on this rollout, the developer may become aware of some performance issues of version 2 of the application. The developer may correct/fix these performance issues and provide an update in the form of version 2.1 of the application to the exact same 5% of users who previously received version 2 of the application. Once the developer is satisfied with performance of version 2.1, including feedback/comments from the 5% of users, the developer may decide to release version 2.1 of the application to increasing percentages of users, such as to 20% of users, and then 50%, in order to verify the stability of their servers under the new load of users. When the developer is ready, version 2.1 of the application may be released to 100% of the user population, thereby launching the newest version 2.1 of the application. The next time the developer wishes to initiate a rollout, they may be able to select a different 5% of the user population so that over time no one particular user consistently receives potentially crash-prone testing versions of an application during testing rollouts.

Figure 1:
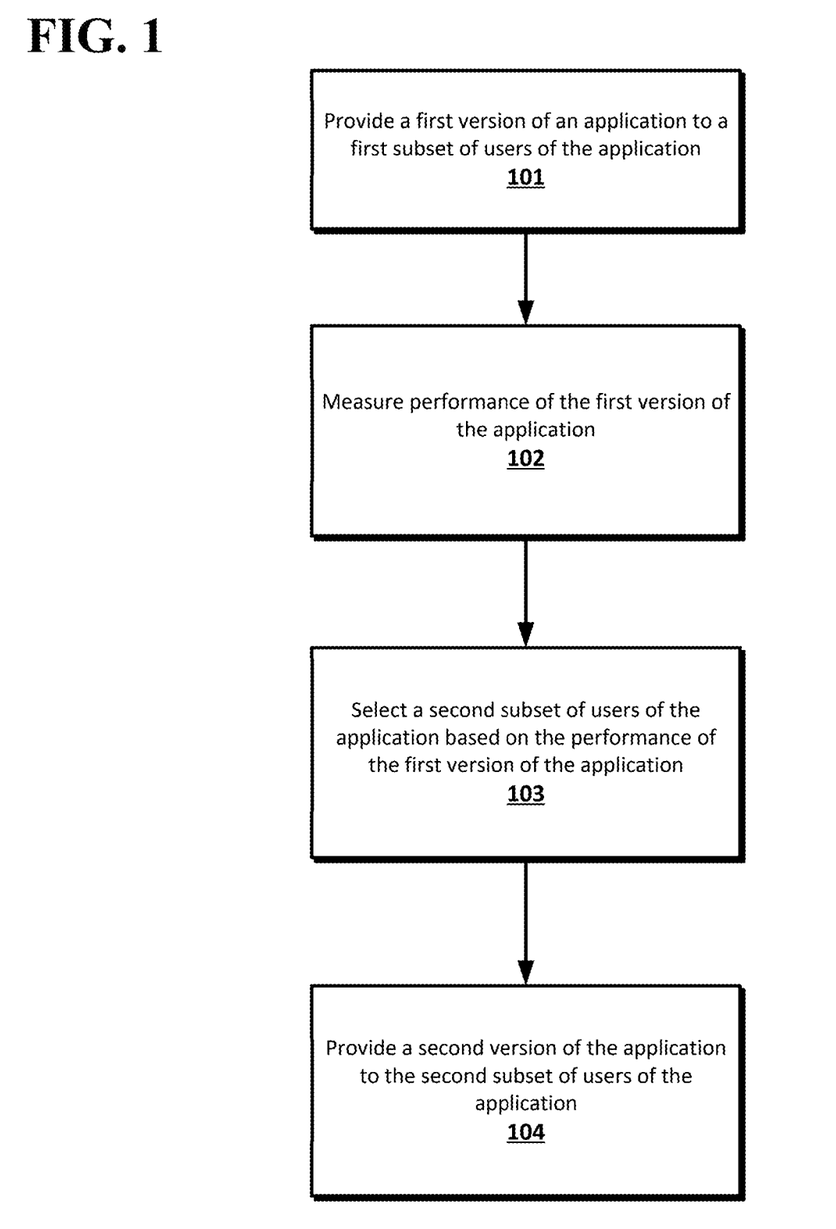
FIG. 1 shows an example process according to an implementation of the disclosed subject matter.

Implementations of the disclosed subject matter provide systems and methods for providing various versions of an application to various subsets of users. FIG. 1 shows an example process according to an implementation of the disclosed subject matter. A method may include providing a first version of an application to a first subset of users of the application, at 101. Performance of the first version of the application may be measured, at 102. Next, a second subset of users of the application may be selected based on the performance of the first version of the application, at 103. As a result, a second version of the application may be provided to the second subset of users of the application, at 104.

In general a version of an application may be a new version of the application, an updated version of the application, a beta version of the application, a test version of the application, an unstable version of the application, a last known working version of the application, a previous version of the application, and the like. An application may be created and/or developed based on an application file format. An application file format can be a file format used to distribute and/or install application software and middleware onto a platform with a given operating system. In some instances, a version may comprise multiple application file formats of an application, and various application file formats may be provided to a relevant set of devices. In other instances, a version may comprise multiple files, each file having the same file format and each including different content. An application developer may specifically configure a version of an application for distribution to a particular subset of users. For example, a developer may configure an alpha version of an application to be provided to the subset of users who have opted in to alpha testing of the developer's applications, the same configuration may apply for a beta version of an application to be provided to a subset of users who have opted in to beta testing. The second version of an application may or may not replace the first version of the application on a user's device. For example, a last known working version, a stable version, or an updated version of an application may be automatically provided to users in a subset who experienced performance issues with a first version of the application. In some instances, within an entire population of users of an application, there may be multiple subsets of users, each subset using different versions of the application at the same time. For example, in some scenarios, the first subset of users may have version 1 of an application and simultaneously the second subset of users may have version 2 of the application. In an implementation, the first version of the application may be the same as the second version of the application. For example, the developer of version 1.0 of a recipe application may wish to test a new version 2.0 of the recipe application. New version 2.0 may be provided to 5% of users of version 1.0, who have opted-in to testing of the recipe application. Performance of version 2.0 of the recipe application may be measured from the 5% of users, and it may be determined that version 2.0 is not experiencing any performance issues. Because version 2.0 is not experiencing any performance issues, it may be provided to 100% of the users of version 1.0. In this case, the first and second versions of the application are the same, that is, version 2.0 of the application.

As discussed above, an application developer or an application provider may create and/or manage one or more communities or subsets of users. Users of an application may be a population of users of an application and may be defined in a variety of ways. Providing an application to a user may encompass providing the application to one, some, or all the devices associated with a user. A population of users may be all users of an application, all users of a specific version of an application, all users of an application associated with a particular demographic, all users who have opted-in to receive a version of an application, and the like. A demographic of users may refer to any segment of the population using an application and may refer to users associated with a device, a device manufacturer, OS version, locale, carrier, cellular standard, geographic region, and any other demographic using a version of an application. For example, a demographic may be based on the particular device running an application such as Smartphone 4 devices, a specific brand of devices, the OS version on the device and/or any other device characteristic that may affect application performance. As another example, a demographic may be based on a specific wireless carrier of a device and/or a cellular standard offered by a wireless carrier, such as, CDMA, GSM, 3G, 4G, 4G LTE, and the like. A demographic may also be based on the locale and/or geographic region associated with a device and/or user. For example, a locale or geographic region may refer to a zip code, area code, city, county, state, country, continent, and/or a region of the world. Further, a demographic may include any combination of the above-described characteristics of a device, a carrier, and location and may further include any other characteristics for defining a population and/or subset of application users.

In an implementation, users may opt-in to receive a version of an application. Additionally, a subset of users of an application may be defined as all the users of an application, a set number of users, a percentage of users ranging from greater than about 0% to about 100%, a fraction of users, a random selection of users, and any other technique for selecting a portion of users. In some instances, the first subset of users may be the same as the second subset of users. For example, a new version 2.0 of an application may be provided to 5% of users; this 5% of users may or may not be randomly selected. The developer may receive poor performance results for version 2.0 and the developer may develop a new improved beta version 3.0 which corrects the performance issues of version 2.0. For testing purposes, the developer may provide the new improved beta version 3.0 to the same 5% of users who previously received version 2.0. In an implementation, the second subset of users may be randomly selected from among users of the application excluding those users in the first subset. For example, the new improved beta version 3.0 may be provided to a random 5% of users, excluding those users who previously received version 2.0. In another instance, the first subset of users may be different from the second subset of users. For example, the second subset of users may be larger than the first subset of users or the first subset of users is larger than the second subset of users. With regard to the example above, the first subset of users may have been 5% of users and the developer may provide the new improved beta version 3.0 to 15% of users. In this case, the first subset of users may overlap with at least a portion of the second subset of users. For example, the 15% of users may or may not include some or all of the 5% of user who previously received version 2.0.

Figure 2:
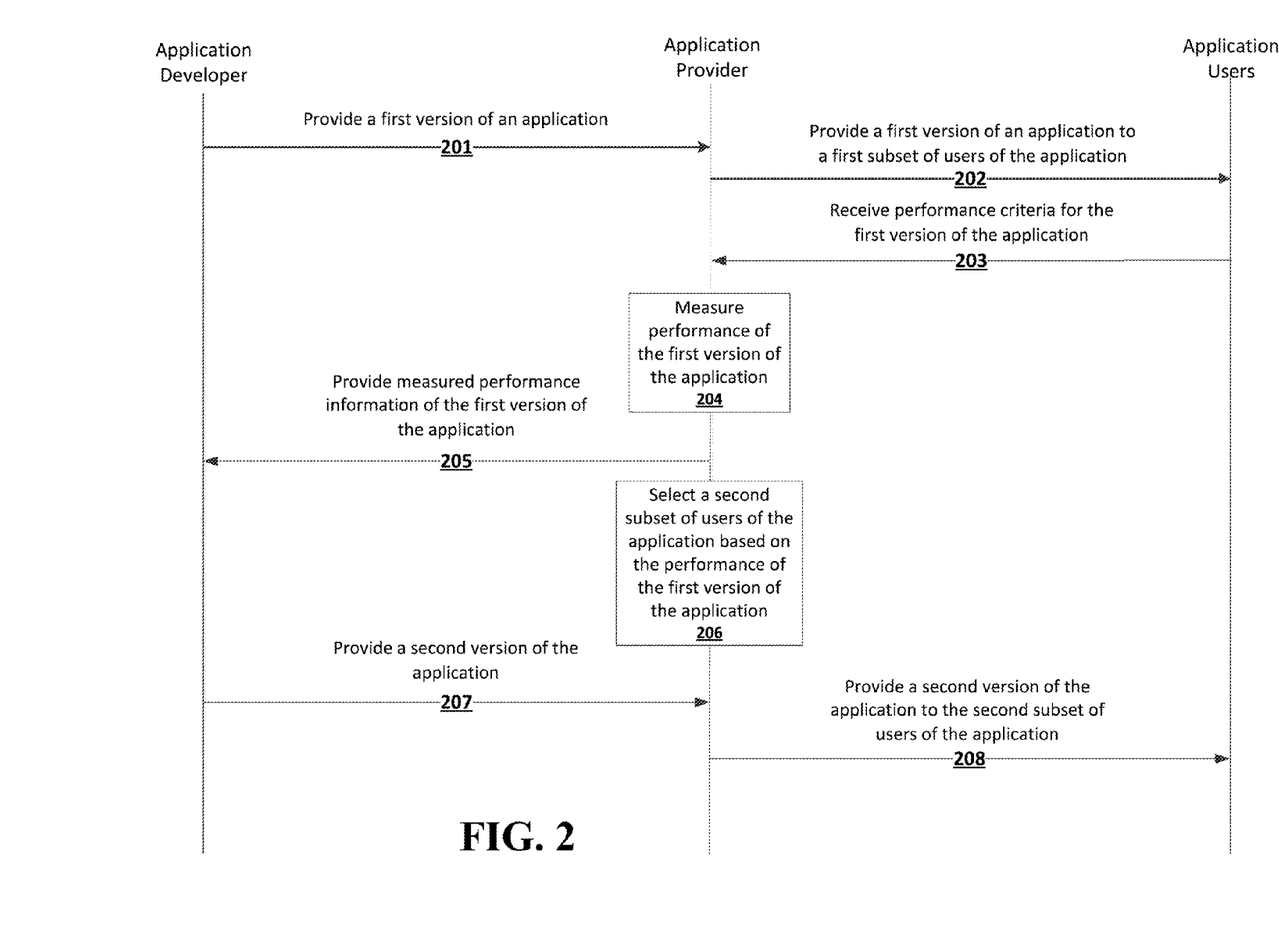
FIG. 2 shows an example information flow according to an implementation of the disclosed subject matter.

An implementation of the disclosed subject matter provides a system for providing various versions of an application to various subsets of users. FIG. 2 shows an example information flow according to an implementation of the disclosed subject matter. A system may include a processor configured to provide a first version of an application to a first subset of users of the application. As shown, an application developer may provide a first version of an application to an application provider, at 201, and the application provider may provide the first version of the application to a first subset of users of the application, at 202. Next, the application provider may receive performance criteria for the first version of the application from the first subset of users, at 203, and the application provider may measure performance of the first version of the application, at 204. The application provider may provide measured performance information of the first version of the application to the application developer, at 205. Measured performance information may be a determination as to how the first version of the application is performing based on the performance criteria received from the first subset of users. Alternatively, the application provider may simply provide performance criteria to the application developer, and/or the application developer may measure performance of the first version of the application based on the received performance criteria. In an implementation, the application developer may receive performance criteria directly from the first subset of users.

Measuring performance of the first version of the application may be performed according to various techniques. For example, measured performance of the first version of the application may be based on one or more performance criteria such as server stability based on the first subset of users, crash reports, activity not responding reports, performance testing reports, battery reports, running services reports, user initiated feedback reports, network reports, application revenue generation, application usage, bug reports, application ranking, number/quality of user ratings, and any other criteria indicating the performance of the first version of the application. Based on the performance criteria received for a first version of an application, a determination may be made as to the measured performance of the first version. The measured performance of the first version of the application may indicate either the presence of performance issues or no performance issues associated with the first version. As an example, performance criteria may be received from all devices running version 6 of a social network application. The performance criteria may include activity not responding reports, user-initiated feedback reports, and performance testing reports from all devices. Based on the reports, it may be determined that version 6 of the social network application is experiencing activity not responding errors on all GSM devices in North America and poor performance test results on tablets in Japan. The second version of the application may correct a performance issue for a given demographic. Further, a second version may correct a performance issue by eliminating or reducing the effect of a performance issue. Accordingly, a new version 7 of the social network application may be provided to all GSM devices in North America and a test version 6T of the social network application may be provided to all tablet devices in Japan.

Further, the application provider may select a second subset of users of the application based on the performance of the first version of the application, at 206, as shown in FIG. 2. Selecting a second subset of users based on the performance of the first version of the application may be performed in a variety of ways. In some instances, if the measured performance of the first version of the application indicates no performance issues associated with the first version, the second subset of users may be larger than the first subset of users. For example, if the first version was provided to 10% of users and there were no performance issues associated with the first version, the first version and the second version may be same and the second version may be provided to 100% of users.

In some scenarios, if the measured performance of the first version of the application indicates a performance issue associated with the first version, the second subset of users may be selected according to various techniques. For example, the second subset may be randomly selected from among users of the application and may or may not include users in the first subset. In some cases, the second subset may intentionally exclude those users in the first subset, or those users in the first subset who received the poorly performing version. The second subset of users may be selected to include only users in the first subset for which the performance issue was detected, for example to correct the performance issue experienced by particular users in the first subset. In some cases, there may be users in the first subset who may have experienced a performance issue, but from whom performance criteria was not received, for whom the performance issue was not determined, etc. Alternatively, the second subset of users may be the same as the first subset of users, for example to correct the performance issue that was experienced by all users in the first subset. The second subset of users may be smaller than the first subset of users perhaps to test a new version of the application, for example the first subset of users may have been 100% of users and the second subset of users may be 5% of users of the application or 5% of users for which a performance issue was detected. In some cases, at least a portion of the first subset of users may overlap with at least a portion of the second subset of users. For example, the first subset of users may have been 20% of users and perhaps only 5% of those users experienced a performance issue, the second subset of users may be 10% of users intentionally including some demographic-derived subset of the initial 20% of users, such as the 5% of users who experienced the performance issue. In some cases, a portion or all of the second subset may be randomly selected and may or may not include users in the first subset, who may or may not have experienced a performance issue. Alternatively, the second subset of users may be selected to intentionally exclude users in the first subset. Several other techniques, not described herein, may be used for selecting the second subset of users.

Next, the application developer may provide a second version of the application to the application provider, at 207, as shown in FIG. 2. Subsequently, the application provider may provide the second version of the application to the second subset of users of the application, at 208. Additionally, the steps described above may be repeated such that a third subset of users of the application may be selected and a third version of the application may be provided to the third subset of users of the application. In some instances, performance of the second version of the application may be measured and the third subset of users may be selected based on the performance of the second version of the application. In addition, the third subset of users may be selected based upon the performance of the first version of the application. In an implementation, each version of an application may be the same as another version, for example, any of the first, second, and/or third versions of an application may be the same. As an example, a developer may currently offer a weather application version 1.0 on the market and may wish to test out a new weather application version 2.0 prior to a release of version 2.0 to the general public. Version 2.0 of the weather application may be provided to a first subset of users, for example 5% of users of version 1.0. The performance of new version 2.0 may be measured based on performance criteria received from the 5% of users. The measured performance may indicate no performance issues associated with version 2.0. Prior to releasing the well-performing version 2.0 to all users of version 1.0, the developer may wish to release version 2.0 incrementally to an increasing subset of users. For example, the second subset of users may be 15% of users of version 1.0, and may include the first subset of 5% of users. This incremental release of version 2.0 may allow the developer to confirm the stability of servers, and the like, in view of the increased load of users. If there are no performance or stability issues associated with version 2.0 based on the 15% of users, version 2.0 may be provided to 30% of users, 50% of users, 75% of users, and so on, while measuring performance of version 2.0 and stability prior to releasing to each subsequent subset of users. In some cases, the third subset of users may be selected to exclude users in the first subset, the second subset, or the first and second subsets.

Each of the steps described herein may be performed by an application provider, an application developer, a subset of users/devices (as appropriate), and/or an intermediary entity. Additionally, in some instances, an application provider may be an application developer. In an implementation, the communication between users/devices, an application provider, and/or an application developer may be across one or more bridges between the interfaces. For example, the communications between the devices and the application provider may be managed or assisted by a third device, such as, a coordinating device, a local coordinator, a remote server, etc. In such cases, the third device may, for example, receive performance criteria from the devices and determine a performance issue relating to a first version of an application. The third device may then provide the performance issue to the application provider, in which case, the application provider may provide a second version of the application to the devices. Alternatively, the third device may receive performance criteria from the devices and provide the performance criteria to the application provider. The application provider may determine a performance issue based on the performance criteria relating to the first version of the application or provide the performance criteria to the application developer. Accordingly, the application provider or an application developer may provide a second version of the application to the devices. In an embodiment, the third device may also act as a bridge between the application provider and the devices when providing the second version of the application to the devices. Furthermore, more than one intermediate device may be implemented to facilitate communication between devices, an application provider, and an application developer.

In situations in which the implementations of the disclosed subject matter collect personal information about users, or may make use of personal information, the users may be provided with an opportunity to control whether programs or features collect user information (e.g., user's geographic location, user's applications, user's device type, user application purchase history, user location history, and other user information upon which selection of a user may be based), or to control whether and/or how to receive applications from the application provider and/or developer that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by an application provider and/or application developer.

Figure 3:
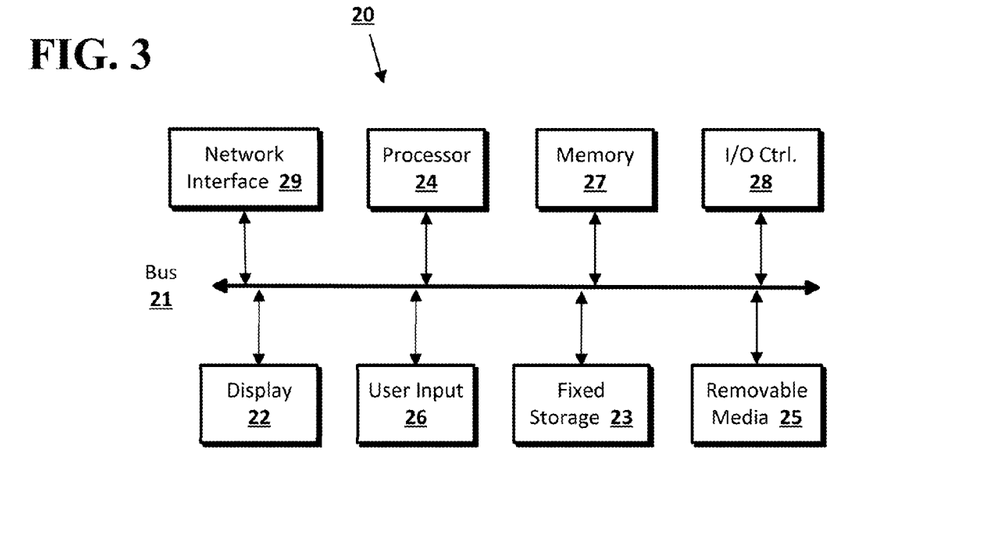
FIG. 3 shows a computer according to an embodiment of the disclosed subject matter.

Embodiments of the presently disclosed subject matter may be implemented in and used with a variety of component and network architectures. FIG. 3 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
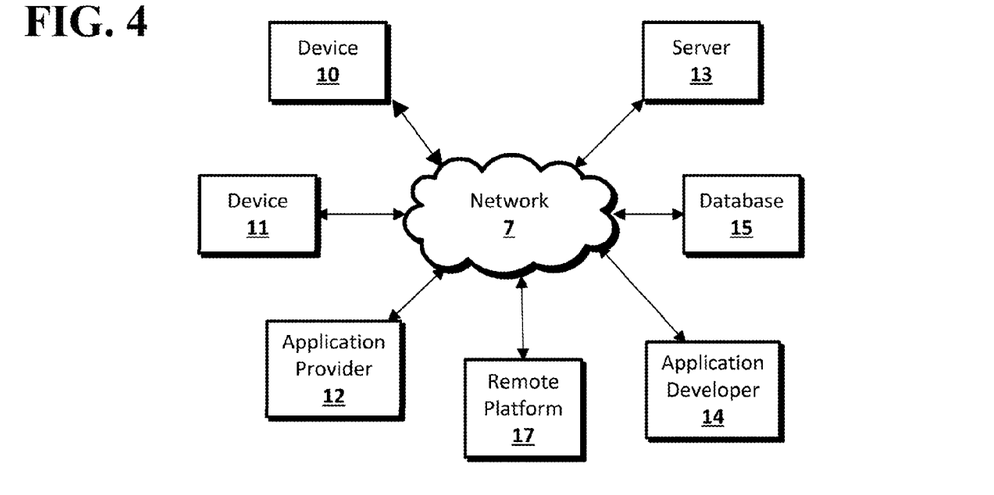
FIG. 4 shows a network configuration according to an embodiment of the disclosed subject matter.

FIG. 4 shows an example network arrangement according to an embodiment of the disclosed subject matter. One or more clients 10, 11, such as local computers, smart phones, tablet computing devices, and the like may connect to other devices, such as application provider 12, application developer 14, and the like via one or more networks 7. The network may be a local network, wide-area network, the Internet, or any other suitable communication network or networks, and may be implemented on any suitable platform including wired and/or wireless networks. The clients may communicate with one or more servers 13, application provider 12, application developer 14, and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13, application provider 12, application developer 14, and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
receiving from an application developer, by an application provider, a first version of an application that is distributed by the application provider, wherein the application provider comprises a device that provides a plurality of applications for digital distribution over a network to client devices associated with a plurality of users;
providing, by the application provider, the first version of the application to a first subset of client devices wherein each client device is associated with at least one user of the application, wherein the first subset of client devices is less than an entirety of client devices available to the application provider to receive the first version of the application;
measuring performance of the first version of the application;
detecting a performance issue for a particular type of device in the first subset of client devices;
selecting, by the application provider, a second subset of client devices of users of the application, comprising devices matching the particular type of device, to receive a second version of the application based on the performance of the first version of the application, wherein the second version of the application is distinct from the first version of the application;

providing the second version of the application to the second subset of client devices of users of the application;

measuring performance of the second version of the application;

selecting a third subset of client devices of users of the application based on the performance of the second version of the application, wherein the third subset of client devices includes the first subset of client devices; and providing a third version of the application to the third subset of client devices of users of the application.

2. The method of claim 1, wherein the first subset of client devices of users is randomly selected from among users of the application.

3. The method of claim 2, wherein second subset of client devices of users is randomly selected from among users of the application excluding those users in the first subset of client devices.

4. The method of claim 1, wherein the second subset of client devices of users is larger than the first subset of client devices of users.

5. The method of claim 1, wherein the first subset of client devices of users is larger than the second subset of client devices of users.

6. The method of claim 1, wherein measuring performance of the first version of the application is based on at least one performance criteria selected from the group consisting of: server stability based on the first subset of client devices of users, crash reports, activity not responding reports, performance testing reports, battery reports, running services reports, user initiated feedback reports, network reports, and any other criteria indicating the performance of the first version of the application.

7. The method of claim 1, wherein the second subset of client devices of users is selected to include only users in the first subset of client devices for which the performance issue was detected.

8. The method of claim 1, the second subset of client devices of users overlaps with at least a portion of the first subset of client devices of users.

9. A system comprising:
a processor of an application provider, wherein the application provider comprises a device that provides a plurality of applications for digital distribution over a network to client devices associated with a plurality of users, the processor configured to:
receive, from an application developer, a first version of an application that is distributed by the application provider;
provide the first version of the application to a first subset of client devices wherein each client device is associated with at least one user of the application, wherein the first subset of client devices is less than an entirety of client devices available to the application provider to receive the first version of the application;
measure performance of the first version of the application;
detect a performance issue for a particular type of device in the first subset of client devices;
select a second subset of client devices of users of the application, comprising devices matching the particular type of device, to receive a second version of the application based on the performance of the first version of the application, wherein the second version of the application is distinct from the first version of the application;
provide the second version of the application to the second subset of client devices of users of the application;
measure performance of the second version of the application;
select a third subset of client devices of users of the application based on the performance of the second version of the application, wherein the third subset of client devices includes the first subset of client devices; and
provide a third version of the application to the third subset of client devices of users of the application.

10. The system of claim 9, wherein the first subset of client devices of users is randomly selected from among the users of the application.

11. The system of claim 10, second subset of client devices of users is randomly selected from among users of the application excluding those users in the first subset of client devices.

12. The system of claim 9, wherein measuring performance of the first version of the application is based on at least one performance criteria selected from the group consisting of: server stability based on the first subset of client devices of users, crash reports, activity not responding reports, performance testing reports, battery reports, running services reports, user initiated feedback reports, network reports, and any other criteria indicating the performance of the first version of the application.

13. The system of claim 9, wherein the second subset of client devices of users is selected to include only users in the first subset of client devices for which the performance issue was detected.

14. The system of claim 9, wherein the second subset of client devices of users is smaller than the first subset of client devices of users.

15. The method of claim 1, wherein at least one of the second subset of client devices or the third subset of client devices is randomly selected.

* * * * *